INVENTOR.
Benjamin J. Barish

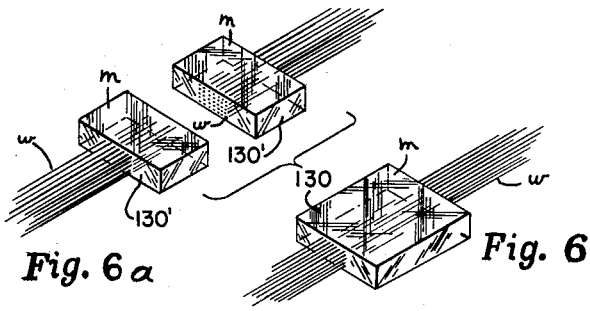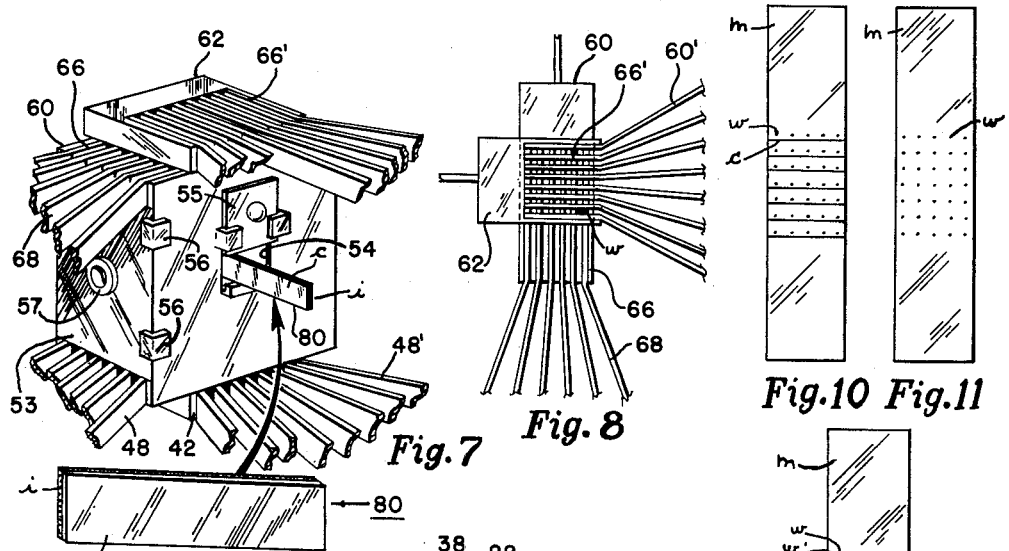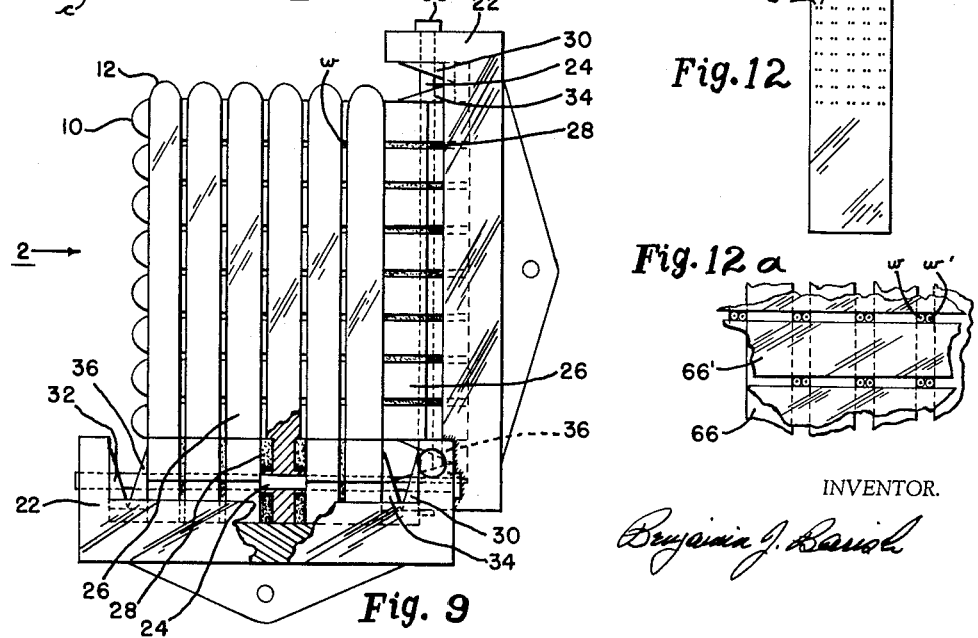

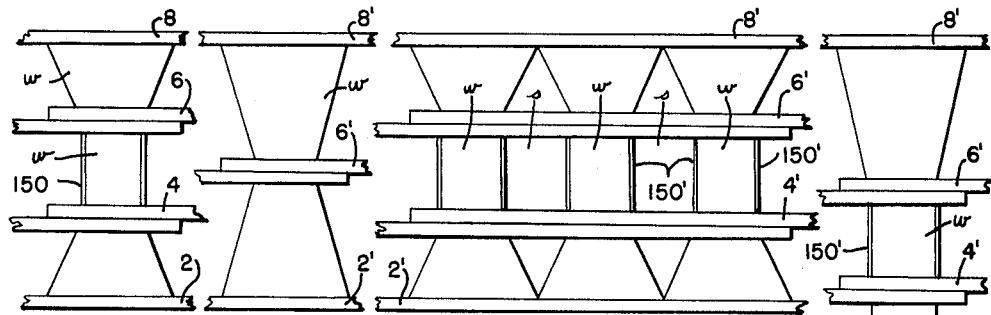
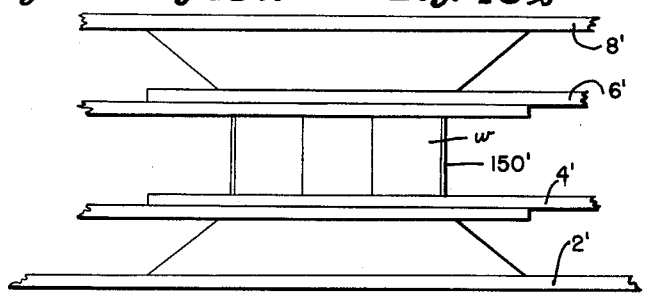
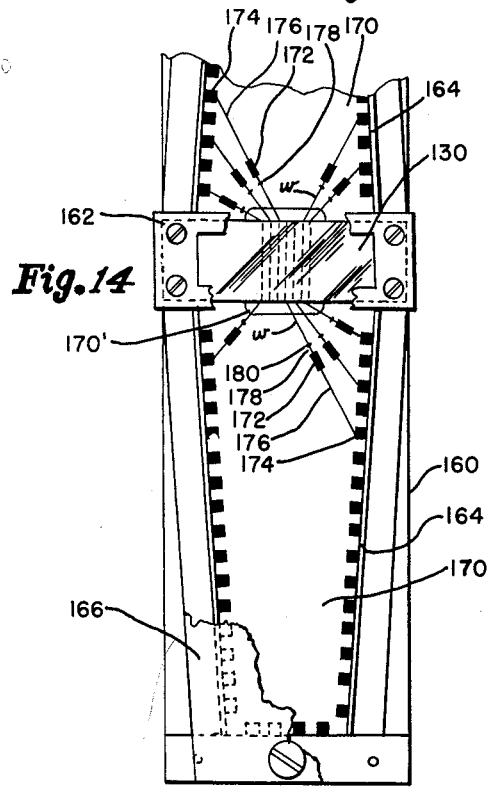
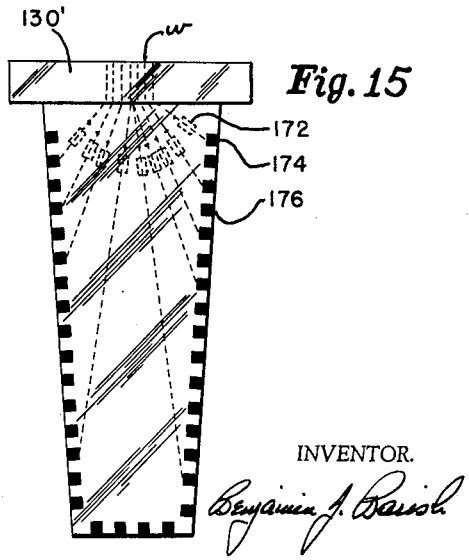

:::::::::::::::::::::::::::::::::::::::::::::::::::::::::::::::
United States Patent Office 3,157,721
Patented Nov. 17, 1964

1

3,157,721
METHOD AND APPARATUS FOR POSITIONING
AND ASSEMBLING WIRES AND THE LIKE
Benjamin J. Barish, Detroit, Mich., assignor to Burroughs Corporation, Detroit, Mich., a corporation of Michigan
Filed Dec. 7, 1959, Ser. No. 857,592
14 Claims. (Cl. 264—157)

The present invention relates to a method and apparatus for positioning and assembling elongated elements such as wires, strands, and the like, and is particularly directed to a method and apparatus for precisely positioning and assembling such articles in critical spatial relationships.

The invention is particularly useful in the manufacture of recording or printing heads consisting of an array or matrix of electrodes which must be very critically spaced with respect to each other. The invention is therefore described with respect to embodiments particularly useful for the production of such printing heads, but it will be understood that this application of the invention is merely illustrative and not limiting. Examples of several forms of heads that may be produced with the described embodiment are those disclosed in U.S. patent applications of Herman Epstein Serial No. 320,592, filed November 14, 1952, now Patent No. 2,919,170; of Herman Epstein and Robert J. Phelps Serial No. 642,872, filed February 27, 1957, now Patent No. 2,919,171; of Robert E. Benn and Richard S. Sakurai Serial No. 729,- 847, filed April 21, 1958; and of Robert E. Benn, Richard S. Howell, and Richard S. Sakurai Serial No. 734,253, filed May 9, 1958, now Patent No. 3,068,479, all of which applications are assigned to the same assignee as the present invention.

A further application, Serial No. 631,194 of Cecil R. Joyce filed on December 28, 1956, now Patent No. 2,931,- 065, assigned to the same assignee as the present invention, discloses a method and apparatus for making a printing head of the foregoing type, wherein a plurality of conductive wires are positioned in a critical spatial relationship, and a medial portion is then molded in a body of dielectric material. The molded assembly is severed transversely to form two units each of which includes a matrix or array of exposed electrodes (the conductive wires) terminating in a common plane on one side of the head, and conductive wire continuations of the electrodes projecting from the opposite end of the head, serving as the leads for energizing the electrodes. The application also discloses a means for assembling the units into complete printing heads with external connectors for each electrode, in a form for insertion into a printing or recording device.

The embodiment of the present invention herein described is directed to another form of positioning and assembling apparatus and method particularly useful in making printing heads.

An object of the present invention is to provide a simple and efficient method and apparatus for positioning wires and the like elements in critical spatial relationships.

A further object of the invention is to provide a method and apparatus capable of positioning and assembling wires and the like in repetitive and continuous operations without reloading or manually repositioning the wires for each operation.

Another object of the invention is to provide apparatus for positioning and assembling wires and the like which may be of a very simple construction for manual operation, and yet which, by the nature of its design, is susceptible to varying degrees of automation for higher volume production.

A still further object of the present invention is to provide a method and apparatus particularly useful for positioning the wires in the production of printing heads.

A still further object of the present invention is to provide a method and apparatus for efficiently producing printing heads.

These and other objects which will become readily apparent as the description proceeds are obtainable by my invention which is hereinafter described with respect to several preferred embodiments thereof illustrated in the accompanying drawings, in which:

FIG. 6 illustrates an encapsulated assembly produced by the apparatus;

FIG. 6a illustrates the two heads produced when the encapsulated assembly of FIG. 6 is severed;

FIG. 7 is a perspective view of parts of the apparatus in assembled relationship preparatory to encapsulating the wires;

FIG. 8 is a top plane view of the parts of FIG. 7;

FIG. 9 is a top plane view, partly in section, of further parts of the apparatus in assembled relationship;

FIGS. 10, 11 and 12 illustrate different variations of printing heads that may be produced by the apparatus of the present invention;

FIG. 12a illustrates a variation of the parts illustrated in FIG. 9 for producing the electrode assembly of FIG. 12;

FIGS. 13 and 13a–13d are various diagrammatic representations of other variations of the invention;

FIG. 14 illustrates a jig fixture for use in building up the electrode assembly into a complete printing head with external connectors and internal resistors; and FIG. 15 illustrates a complete printing head produced with the jig fixture of FIG. 14.

Figure 1:
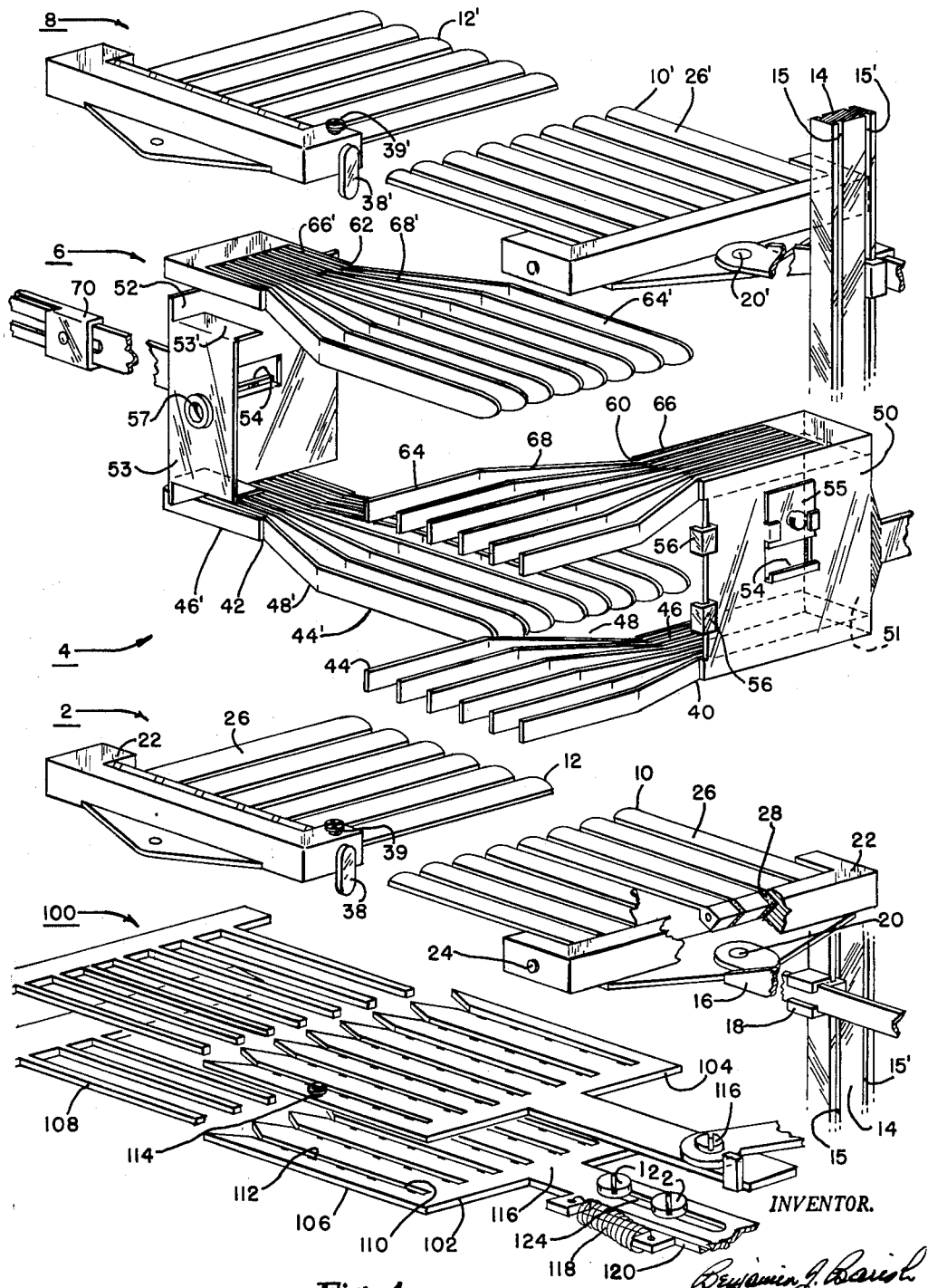
FIG. 1 is a perspective view of the more salient parts of the apparatus constructed in accordance with the invention.

The apparatus illustrated is designed for use in making an electrode assembly comprising a rectangular matrix of 5 x 7 wires w encapsulated in a molding compound m, (e.g. FIGS. 10–12), the electrode assembly to be used in producing a complete printing head such as that illustrated in FIG. 15. The preferred form of printing head electrode arrangement is that shown in FIG. 10, wherein an auxiliary electrode c is provided common to, and closely adjacent to, each row of wires w. The purpose of this auxiliary electrode is explained in another copending application of Richard S. Howell, Serial No. 734,196, filed May 9, 1958, now Patent No. 2,918,580, and also in the above-referenced application Serial No. 734,253, now Patent No. 3,068,479. It will be seen, however, that the apparatus could also be used in making a printing head of the electrode arrangement of FIG. 11 (without the auxiliary electrodes c), or that of FIG. 12 (wherein a pair of wires w and w' is used for each of the wires w in FIG. 11), as well as other designs of electrode assemblies, printing heads and other articles.

Briefly, the apparatus of the present invention includes "coarse" comb-like elements and "fine" comb-like elements. The former elements are referred to as "coarse" since they position the wires at uncritical spatial relationships from each other, that is, either significantly farther apart (which is the case for the particular application disclosed), or significantly closer together, than the required critical spatial relationships. The latter elements are referred to as "fine" since they position the wires at the required critical spatial relationships. It will also be understood that the term "comb" and the like expressions used herein contemplate any structure or configuration which includes teeth or similar spacing elements adapted to perform the functions described; also, that the term "wires" includes other structures, such as threads, rods, strands and the like, which lend themselves for handling or processing by the present invention.

As will be more fully described below, in using the device the wires are first loaded in the apparatus and are engaged and gripped by a first pair of coarse combs at a first station. These combs are then raised past a second station, carrying the wires therewith as the latter are reeled from their respective supply spools, until the combs assume an elevated position at a third station. A second pair of coarse combs is then caused to engage the wires at the first station whereby the wires at the second station, between the two pairs of coarse combs, are maintained in a somewhat even, but uncritical, spatial relationship with respect to each other. Two pairs of fine combs positioned between the two pairs of coarse combs are then caused to engage the wires at the second station and, as will be discussed hereinafter in more detail, they position the wires in the required critical spatial relationship. This portion of the wires is then encapsulated by an insulating molding composition. In the disclosed device, the molding plates for encapsulation are formed integral with the fine comb assembly. After encapsulation, the wires are severed just below the first pair of coarse combs (which at that time are in the elevated position), and just above the second pair of coarse combs, (in the lower position); the encapsulated assembly is then removed; the fine combs are then withdrawn; and, since the second pair of coarse combs (those in the lower position at this point) will engage the ends of the wires from the supply spools, the apparatus is in condition for a subsequent operation by elevating the second pair of coarse combs, etc., in continuous and repeating cycles of the steps set forth above.

The device illustrated also includes means for loading and guiding the wires, to facilitate the initial loading of the wires from their supply spools and also to guide them in an orderly fashion from their supply spools to the arrangement of combs. This means may also be used for applying an even tension to all the wires, which is desirable particularly in the encapsulation step.

Further disclosed is the manner in which the encapsulated electrode assemblies produced by the foregoing apparatus may be used for making complete printing heads, complete with external connectors and internal resistors.

Figure 4:
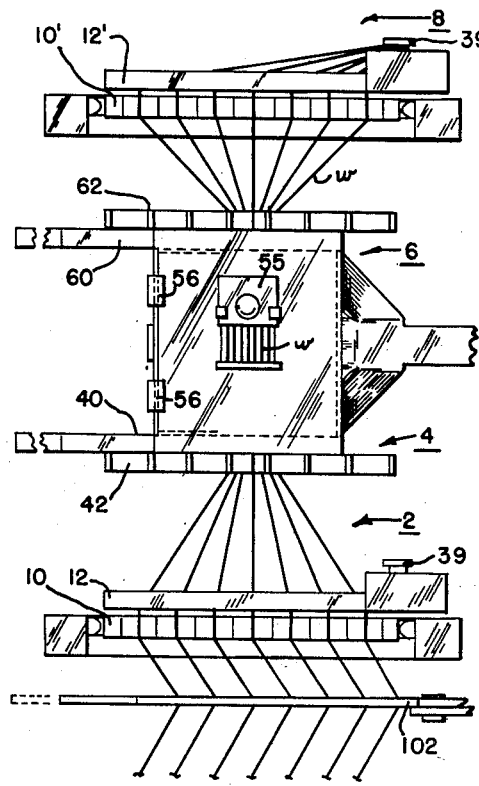

FIG. 4, depicting one stage in the production of the printing head, illustrates the general arrangement of the salient parts of the device referred to above. FIG. 1 shows these parts in more detail. It will be seen that the first pair of coarse combs is designated 2, the first pair of fine combs is designated 4, the second pair of fine combs is designated 6, and the second pair of coarse combs is designated 8. Generally designated 100 in FIG. 1 is the loading and guiding means referred to above. FIG. 4 depicts the positions of these parts at the point in the production of the printing heads where the wires are positioned in their critical spatial relationships preparatory to their encapsulation by the molding compound. At this stage, it will be seen that the pairs of coarse combs 2 and 8 maintain the wires in an uncritical spatial relationship, while the portion of the wires between the pairs of fine combs 4 and 6 are in their critical spatial relationship. It is the latter portion which is encapsulated by the molding compound.

The constructions of comb pairs 2, 4, 6 and 8 are illustrated particularly in FIG. 1. Two combs 10 and 12 comprise the pair of coarse combs 2, and are each mounted on a vertical support or standard for movement in a vertical direction. Only one support 14 is shown in the drawings, this being the support for comb 10, there being a similar vertical support for comb 12. Each of the combs 10 and 12 is also mounted for extension and retraction in a horizontal plane. The vertical support 14 for comb 10 is arranged to permit its comb to be extended toward and at right angles to comb 12, and vice versa, so that when both combs 10 and 12 are in their extended positions they assume a crossed juxtapositional relationship as illustrated in FIG. 9. For this purpose, comb 10 is illustrated as being carried on a bracket 16 received for horizontal reciprocative movement in a slide 18 mounted for vertical movement in grooves 15 of vertical support 14. Also, comb 10 is mounted for pivotal movement in a horizontal plane about pivot point 20 so that it may be pivoted out of the working area when not being used. Similar structure (not illustrated in detail) is also present with respect to comb 12.

The structure of each of combs 10 and 12 is substantially the same and is best seen in FIGS. 1 and 9. Each comprises a frame piece 22, a shaft 24 extending through the length of the frame piece, and a plurality of teeth or tines 26 slidably received on the shaft. The teeth are normally maintained in an open or spread-apart relationship by resilient separators 28 inserted between each pair of teeth, but means are provided for closing or drawing the teeth together. As shown particularly in FIG. 9, this latter means comprises a pair of camming elements 30 and 32 each fixed on an opposite end of the shaft 24, and a pair of camming elements 34 and 36 slidably received on shaft 24. When shaft 24 is rotated, camming element 30 will rotate therewith and will move its cooperating element 34 and teeth 26 (both being slidably but non-rotatably received on the shaft) against the resilient separators 28. Similarly, camming element 32 at the opposite end of the shaft will bear against element 36 to move the same and the teeth 26 from that end. In this manner, rotation of shaft 24 will force camming elements 34 and 36 to move toward each other on shaft 24 and, thereby, to cause teeth 26 to be drawn together. A lever arm 38 (see FIG. 1) is provided on each of combs 10 and 12 for manually rotating the shaft and thereby for moving together the teeth of its respective comb.

During use, the two combs 10 and 12 are positioned with respect to each other to assume a crossed juxtapositional relationship with their teeth open and with the wires $w$ lodged in the spaces between the teeth. (Loading and guiding means 100 for initially loading the apparatus is described below.) The teeth of the combs are then moved together to close the spaces by operation of lever 38, in the manner described above, whereby the wires are gripped and retained in a coarse rectangular matrix, shown in FIG. 9. Each wire is still spaced from the others at a considerably greater distance than the required critical, or fine, spacing in the finished product. For one particular application, the wires $w$ are about 3 mils (.003 inch) in diameter, and their required spacing is about 25 mils. In such an arrangement, the width of the teeth 26, which determines the coarse spacing between the wires, may be in the order of several times 25 mils.

The sides of the teeth 26 may be provided with gripping surfaces so as to firmly grip the wires $w$ therebetween when lever 38 is operated and the teeth are closed. Ordinarily, this should be sufficient gripping, but where the wires are of very small diameter, as in this case (about 3 mils), it may be desirable to provide additional means for more firmly anchoring the wires to the combs. In the device illustrated, this is very simply accomplished by the provision of a pin 39 on the upper comb 12 of the pair 2. To assure that the wires will be firmly anchored to the combs and thereby will be moved with the combs, the operator would merely wrap the wire ends several turns about the pin.

Since the device illustrated is designed for use in making a printing head comprising a rectangular matrix of 5 x 7 electrodes, it will be seen that comb 10 includes eight teeth 26 to accommodate seven rows of wires, and comb 12 includes six teeth to accommodate the five columns of wires.

The second pair 8 of coarse combs is of substantially the same structure as pair 2. It likewise includes a pair of combs 10′ and 12′, comparable in structure and function to combs 10 and 12 of pair 2. Both combs of pair 8 include lever 38′ and its cooperating structure for opening and closing the teeth 26′, and the upper comb 12′ includes the pin 39′, both of which features aid in firmly anchoring the wires to the combs so as to be carried therewith, as in combs 10 and 12. Combs 10′ and 12′ are mounted for vertical movement on the same vertical support as combs 10 and 12, except they move on a separate track. This is illustrated in FIG. 1 where it is seen that comb 10 is movable on track 15 of support 14, whereas comb 10′ is movable on track 15′. Since the combs are also pivotable in the horizontal plane (pivot point 20 for comb 10, and 20′ for comb 10′), it is seen that the combs of pairs 2 and 8 may be raised and lowered without interference from or with the combs of the other pair.

Figure 2:
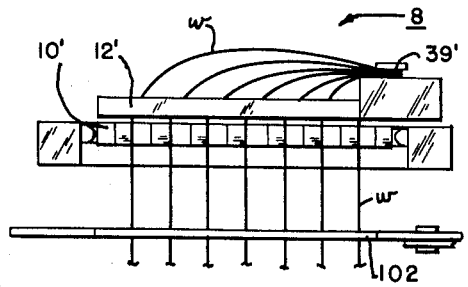
FIGS. 2–5 illustrates the various stages of making a printing head with the apparatus of FIG. 1.
Figure 3:
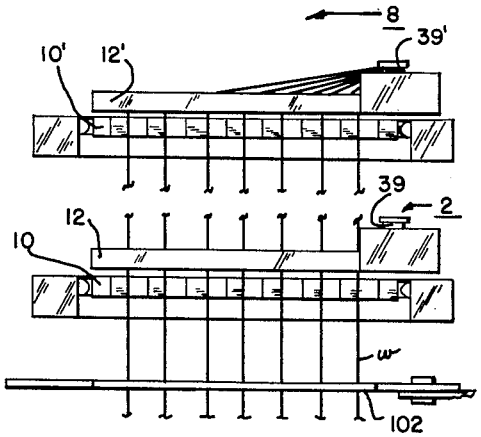

FIG. 2 illustrates the pair 8 of coarse combs 10′ and 12′ in the lower position with the wires w maintained in a crossed rectangular matrix by the closed teeth of these combs, the ends of the wires being more firmly anchored to these combs by being wrapped about pin 39′. (Pair 8 is illustrated in the lower position, so that during the step of FIG. 4 the arrangement of parts will correspond to that illustrated in FIG. 1.) With the wires anchored to the coarse combs, the latter are raised to an elevated position, as shown in FIG. 3, and the other pair of coarse combs (pair 2 illustrated in FIG. 3) is moved into the lower position whereby its two combs assume the crossed juxtapositional relationship with the wires w in the spaces between their teeth. The wires between the two pairs 2 and 8 of coarse combs are thereby maintained in a coarse rectangular matrix arrangement (see FIG. 3), but the teeth of lower pair 2 are sufficiently open to permit the wires to move with respect thereto. As will be described below in more detail, the two pairs of fine combs 4 and 6 are then moved into position between the pairs of coarse combs 2 and 8, causing the portions of the wires w between the two pairs of fine combs 4 and 6 to be positioned in the fine, or critical, spatial relationship required in the finished printing head. This portion of the wires is then encapsulated with the molding compound.

Referring to FIG. 1, the first pair 4 of fine combs is composed of combs 40 and 42, and the second pair 6 of fine combs is composed of combs 60 and 62. In operation, comb 40 is positioned in a crossed juxtapositional relationship with respect to comb 42 to position the portion of the wires engaged thereby in the critical spatial relationship. Similarly, comb 60 is moved into a crossed positional relationship with respect to comb 62. Thus the portions of the wires between the two pairs 40, 42 and 60, 62 of fine combs is maintained in the critical spatial relationship required in the finished printing head. For encapsulating this portion of the wires with the molding composition, the plates forming the mold are made integral with the combs so that they will automatically be moved into proper position for molding when the combs are operated.

As seen in FIG. 1, a first plate 50 and a second plate 51 join fine combs 40 and 60 together, these two plates constituting the front wall and a side wall of the mold. The back wall and the other side wall of the mold are formed by plates 52 and 53 respectively, which join fine combs 42 and 62 together. The bottom wall of the mold is formed by the crossed teeth of combs 40, 42, and the top wall of the mold is formed by the crossed teeth of combs 60, 62. In the device disclosed, walls 50 and 52 are each formed with an opening 54, closable by a plate 55, for inserting the auxiliary electrodes c into the mold when making the printing head of FIG. 10. Wall 50 is also formed with abutting elements 56 for engaging and positioning wall 53 and thereby comb assembly 42 and 62 with respect to comb assembly 40 and 60. As illustrated, wall 53 does not extend the full height to join with its combs 42 and 62, but rather terminates short of these combs to provide room for accommodating combs 40 and 60 when the parts are in proper position for molding. An opening 57 is formed in wall 53 for the injection of the molding compound. FIG. 7 illustrates all the foregoing parts in their assembled relationship.

As in the arrangement of comb pairs 2 and 8, combs 40 and 60 are used for positioning five columns of wires, and therefore there are six teeth in each comb to provide spaces therebetween for accommodating the five columns of wires; and combs 42 and 62 each include eight teeth to accommodate the seven rows of wires.

The structure of the teeth in each of combs 40, 42, 60 and 62 is substantially the same as in the others. Referring to comb 60, its teeth include a first straight portion 64 coarsely spaced corresponding to the spacing in the coarse combs 12 and 12′; a second straight portion 66 parallel to portion 64 but critically spaced corresponding to the required spacing of the wires in the printing head; and an intermediate flaring portion 68 which joins portions 64 and 66. Corresponding parts on comb 62 are 64′, 66′ and 68′. Combs 40 and 42 are similarly constructed with parts 44, 46 and 48 being shown for comb 40; and parts 44′, 46′ and 48′ being shown for comb 42. Combs 42 and 62, being interconnected by plates 52 and 53, are moved as a unit, and combs 40 and 60 are similarly moved as a unit, both assemblies being mounted for movement toward and at right angle to each other, as for example by slide 70 for each assembly. When the assemblies are so operated, each of the fine combs is first moved to juxtapose portions 44 with 44′ and 64 with 64′ in each pair, the wires being disposed in the spacings between the teeth. At this position the wires are still in the rectangular matrix arrangement maintained by the coarse combs 10, 12, 10′ and 12′. As the two comb assemblies are then further moved toward and at right angle to each other, the wires ride along flared portions 48, 48′ and 68, 68′ until portions 46, 46′ and 66, 66′ are juxtaposed, as determined by limits 56 abutting against wall 53. During this movement the wires are forced to move along the flared portions of the teeth until they are positioned in their critical spatial relationships in the spaces of the fine-teeth portions 46, 46′ and 66, 66′. FIG. 8 illustrates this final position of the combs and of the wires.

It will be appreciated that coarse-teeth portions 44, 44′, 64, 64′ of the fine combs serve primarily to engage the wires coarsely-spaced by coarse combs 10, 12, 10′ and 12′, and therefore may be nothing more than the ends of the flaring portions 48, 48′, 68, 68′ remote from the fine-teeth portions 46, 46′, 66, 66′. In other words, the fine teeth could be formed without the straight portions 44, 44′, 64, 64′, whereupon the wires in their coarse array or matrix would be first engaged by the tips of the flaring portions 48, 48′, 68, 68′ and then moved into the fine-teeth portions 46, 46′, 66, 66′. The arrangement illustrated is preferred, however, as it provides more positive control in first engaging and then positioning the wires by the combs, especially where the required wire spacing is very small.

In using the device illustrated for positioning and assembling wires in critical relationships, it will be apparent that the dimensions of the coarse combs 10, 12 and 10′ and 12′ are not critical. What is critical are fine combs 40, 42 and 60, 62 and the positions they assume when in engagement with the wires just before the molding step. What is particularly critical is the dimensions of fine-teeth portions 46, 46′, 66, 66′. Assuming the wires in the printing head are about 3 mils diameter and are spaced about 25 mils from each other, it will be seen that the thickness of each of the teeth in these portions should be 25 mils and that the spaces between the teeth should be 3 mils. The incorporation of the molding plates 50, 51, 52 and 53 as an integral part of the fine combs, and the provision of elements 56 on wall 50 for limiting on wall 53, more positively assure that these critical portions of the fine combs will be in their proper relationships at the time the wires are to be encapsulated.

It will be noted that the fine-teeth portions 46 and 66 of combs 40 and 60 are of a length greater than the corresponding fine-teeth portions 46' and 66' of combs 42 and 62, respectively. The reason for this is that in the printing head to be produced, the wires are closely adjacent to one pair of opposite sides of the head, but are spaced considerably away from the other pair of opposite sides. (See FIGS. 10–12.) To block the flow of plastic through fine-teeth portions 46 and 66 not covered by portions 46' and 66' during the encapsulation step, wall 53 is provided with in-turned ends 53' which will be juxtaposed with respect to these extensions of portions 46' and 66'.

As indicated above, the preferred form of printing head is that shown in FIG. 10 wherein an auxiliary electrode $c$ is provided between, and closely spaced to, each row of wires $w$. Openings 54 closable by covers 55 are provided in plates 50 and 52 for producing this type of head. During the stage of assembling the head illustrated in FIG. 4, when the molding plates are in position but before introduction of the molding compound, thin tab elements 80 are introduced through windows 54 between the wires $w$. This is illustrated in FIG. 7. These tab elements 80 consist of a layer of conductive material, which serves as the auxiliary electrode in the finished head and is therefore designated as $c$ in FIG. 7, and a layer of insulating material designated as $i$. The thickness of the conductive layer $c$ corresponds to the thickness of the auxiliary electrode in the finished head, and the thickness of the insulating layer $i$ corresponds to the space required between the row of wires $w$ and the auxiliary electrode $c$ in the finished head. In one application the auxiliary electrode is to be about 2 mils in thickness and the space between the auxiliary electrode and the wires $w$ (called pin electrodes in the finished head) is to be about 2 mils; therefore the thickness of the conductive layer $c$ and the insulating layer $i$ in tab 80 would each be 2 mils.

Tab elements 80 may be introduced into the mold between the wires by a jig fixture, or individually by hand. Each tab element is inserted with its insulating layer $i$ in contact with a row of wires, and the two ends of the tab 80 are then bent over to temporarily retain the tab in position. Slidable plates 55 are then moved to close the openings 54 and to engage the ends of the tabs, firmly holding them in position. The molding compound is then introduced through opening 57 of mold plate 53 in any conventional manner, as for example by applying a vacuum to one side of the mold in order to more positively force the tabs against their respective wires. When the assembly is encapsulated by the molding compound, the tabs 80 will form a part of the molded assembly occupying the middle portion, with the ends of the individual tabs projecting from the molded assembly and thereby able to be used for making the electrical connections to the auxiliary electrodes.

The foregoing description has been directed to making the printing head of FIG. 10 with the auxiliary electrodes $c$. It will of course be understood that the same method and structure, but omitting the steps and the structure used in introducing tab elements 80, can be used for making the printing head of FIG. 11 which does not include the auxiliary electrodes $c$.

The molded electrode assembly produced by the device is generally designated as 130 and is illustrated in FIG. 6, except that the auxiliary electrodes, if included, are not illustrated. The assembly of FIG. 6 may then be cut in half, as shown in FIG. 6a, to produce two electrode units 130' each of which includes the matrix of wires $w$ terminating in a common plane on one side of the head and thereby forming exposed electrodes, and conductive wire continuations of the electrodes projecting from the opposite end of the head and serving as the electrical connections for energizing the electrodes. If tab elements 80 had been inserted into the assembly, as described above, it will of course be appreciated that they would occupy the middle portion of the molded assembly illustrated in FIG. 6, and therefore would be severed in half when the assembly is severed as shown in FIG. 6a, to form the exposed electrode surface illustrated in FIG. 10.

To produce the electrode arrangement illustrated in FIG. 12, wherein the pair of wires $w$ and $w'$ are used for each of the wires $w$ in FIG. 11, a pair of wires would be used, instead of one wire, for each of the wires in the matrix or array. The spacing between the wires of each pair would be determined by an insulating coating on one or both of the wires. For example, if the wires $w$ and $w'$ in the printing head of FIG. 12 are each to be of 3 mils diameter with 2 mils spacing therebetween, each of the wires in the pair would be of 3 mils diameter, and insulated with a one mil plastic coating. The spacings between the teeth of all the combs, and particularly the fine-teeth portions of combs 40, 42, 60 and 62, would be designed to accommodate a pair of insulated wires, instead of the individual wire of the earlier-described arrangements, and the wires would thereby be properly positioned during the above-described operations of the apparatus. FIG. 12a illustrates a fragment of a pair of juxtapositioned teeth 66, 66' corresponding to fine-teeth portions of combs 60, 62 but modified to accommodate a pair of the wires rather than the one wire in each of the spaces formed between the crossed juxtapositioned teeth.

As alluded to above, the device illustrated also includes a loading and guiding arrangement 100 to facilitate the initial loading of the device with the wires from their supply spools, and also to maintain the wires in an orderly fashion as they are payed out from their supply spools during the continuous operations of the device. As shown in FIG. 1, the loading and guiding arrangement includes two members 102 and 104 both mounted, preferably, on the same vertical support 14 as for example coarse combs 10 and 10'. Member 104 is used solely for initial loading, and once it is loaded, this member is removed or moved to a position where it will not interfere with the normal operations of the device. Member 102 is used for guiding the wires from their supply spools and may also be used for applying an even tension to the wires during certain or all of the operations. Member 102 is therefore retained in the device and is used throughout all operations thereof.

Both members 102 and 104 are somewhat similarly constructed. Each includes a slotted and notched plate 106 and a removable comb-shaped insert 108. Plate 106 is formed with a number of slots 110 corresponding in number and spacing to the rows of wires in the coarse matrix to be assembled, and each slot is provided with notches 112 corresponding in number and spacing to the columns of wires in the coarse matrix. Thus in the arrangement disclosed, plate 106 for each of members 102 and 104 is formed with seven slots to accommodate seven rows of wires, and each slot is formed with five notches to accommodate the five columns of wires. The comb-shaped inserts 108 for members 102 and 104 are removably press-fitted into the slots in its respective plate 106.

During the initial loading, members 102 and 104 are juxtaposed in the position illustrated in FIG. 1 wherein the slots 110 of both members are aligned and the comb-shaped elements 108 are detached. The wires are then individually inserted into both plates 106 of members 102 and 104 at the same time by moving them along the aligned slots until they reach the proper notch, whereupon they may be bent to temporarily retain them in their respective notches. The wires are thus spaced by the slots and notches in a coarse matrix arrangement corresponding to the spacings in the coarse combs. Both of the elements 108 are then inserted into their respective plates 106, the individual wires projecting through their respective notches in both plates. The projecting ends of the wires may then be wrapped around a pin 114 formed on the upper surface of plate 106 of member 104 to anchor the upper ends of the wires to that member in a manner similar to that described above with respect to pins 39 and 39' in coarse combs 12 and 12'. Member 104 is then raised to a position above that of the lower pair of coarse combs, 2 or 8 whichever is in the lower position. As the wires between members 104 and 102 are thus spaced in a coarse rectangular matrix corresponding to that of the coarse combs, the lower pair of coarse combs is then moved into the crossed juxtapositional relationship with the wires between their teeth. Levers 38 are then operated to cause the teeth of the respective combs to engage and grirp the wires. The wires are then severed just above the pair of coarse combs, and the wires may then be anchored thereto by wrapping about pin 39 in the manner described above. The device is thus loaded for continuous operations, and therefore loading member 104 may be removed or may be pivoted about its pivot member 116 out of the working area, as it is no longer needed.

Member 102, however, remains positioned below the lower pair of coarse combs and serves to guide the wires as they are fed from the supply spool to the device during continuous operations thereof. In the disclosed arrangement, member 102 is also used to apply an even tension to the wires. This is accomplished by introducing a spring coupling in the bracket to which it is attached to its support. Thus, as shown in FIG. 1, member 102 is supported by bracket 116 which in turn is secured to one end of a spring 118, the other end being secured to another bracket 120. Bracket 116 is permitted to be moved (rightwardly in FIG. 1) with respect to bracket 120 by means of a releasable connection comprising a pair of screws 122 formed on bracket 120 and received in, but releasable from slot 124 formed on bracket 116. Bracket 120 is secured to a support member (not shown) which could be the same member 14 that supports coarse combs 10 and 10'. Thus, during use and particularly before introduction of the molding compound in the step illustrated in FIG. 4, screws 122 may be released to permit spring 118 to urge member 102 rightwardly and thereby to apply an even tension to all the wires positioned in notches 112 of its plate 106. In this manner the wires are kept evenly taut during the encapsulation.

Following is a brief summary of the overall operation of the apparatus disclosed with particular reference to FIGS. 2–5: The wires are initially loaded into the loading and guiding means 100, in the manner described above, whereupon coarse combs 10', 12' of pair 8 at the lower or first station are moved into a crossed juxtapositional relationship to engage the wires and support them in a coarse rectangular matrix arrangement. This is shown in FIG. 2, where it is also seen that loading member 104 has been removed and guiding member 102 is retained to guide the wires as they are unreeled from their supply spools. As will be recalled, after the initial loading, reloading is unnecessary between operations, it only being necessary after the wire on the supply spools is exhausted. Also seen in FIG. 2 are the wires wrapped about pin 39' to more firmly anchor them to the combs 10' and 12'.

Combs 10' and 12' are then raised, as shown in FIG. 3, past the second station, occupied by the fine combs, to the upper or third station, and the other pair of coarse combs 10 and 12 are moved into the crossed juxtapositional relationship to engage the wires at the lower position, or first station. The two wires are thus supported by the two pairs of coarse combs in a rectangular matrix arrangement having coarse or uncritical spacings.

Positioned between the two pairs of coarse combs, at the second station, are the fine combs 40, 60 and 42, 62, each assembly being movable as a unit toward and at right angles with respect to the other assembly. During these movements of the two comb assemblies, coarse-teeth portions 44, 44' and 64, 64' first engage the wires, then force them to move along the flared portions 48, 48' and 68, 68', until they finally are lodged in the spaces between the fine-teeth portions 46, 46' and 66, 66'. The wires are thereby positioned in their critical spatial relationship in the latter portions of the fine combs, and it will be noted that throughout this positioning of the wires, they are always maintained in the rectangular matrix arrangement. It is thus seen that the portions of the wires between combs 40, 42 and 60, 62 are critically spaced in the rectangular matrix required in the finished printing head.

This portion of the wires is then encapsulated by injecting a molding compound into opening 57 of wall 53 of the mold, the mold being formed by walls 50, 51, 52 and 53 integral with the fine comb assemblies. Portions 46, 46' and 66, 66' of the combs themselves form the top and bottom walls of the mold. If the head of FIG. 10 is to be produced, the tab elements 80 are introduced through the openings 54 of the moulding plate before introduction of the molding compound. Also before molding, screws 122 (FIG. 1) of guiding plate 106 are released (If not sooner done) to cause spring 118 to apply an even tension to all the wires. This stage in the production of the printing heads is illustrated in FIG. 4.

Figure 5:
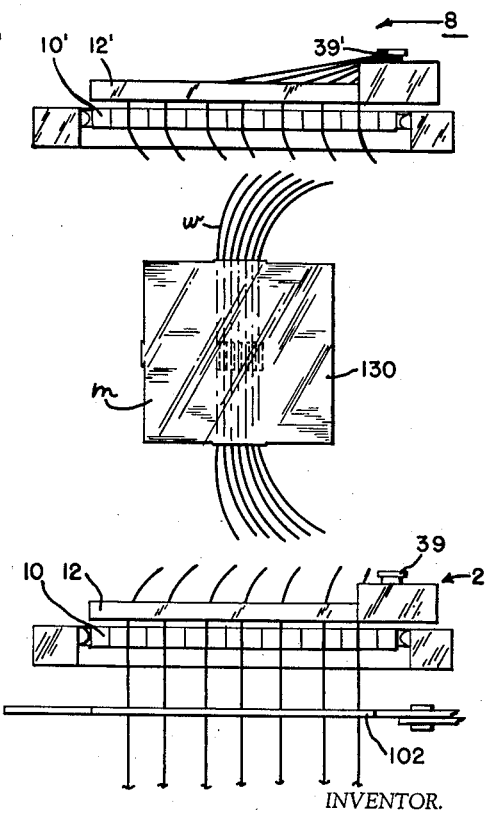

After the molding compound has set, levers 38 of the coarse combs 10 and 12 (which are now in the lower position) are rotated to force camming elements 30 and 32 to close the teeth of their respective combs and to grip the wires; the wires are then severed just above this pair of combs and just below the upper portion of combs 10' and 12'; and the fine comb assemblies 40, 42, 60, 62 and the molding plates are withdrawn leaving an assembly 130 of wires w encapsulated in their midportions by a molding compound m as shown in FIG. 5.

Since the lower pair of coarse combs 10 and 12 still grip the ends of the wires (if desired, the wires may be more firmly anchored to the combs by wrapping about pins 39), the coarse combs 10 and 12 may be elevated to the upper position occupied by combs 10' and 12' (the latter having been pivoted out of the way and returned to the lower position), and the whole process repeated for producing further encapsulated assemblies.

It is thus seen that the disclosed apparatus is capable of producing such assemblies in repetitive and continuous operations without reloading or manually repositioning the wires for each operation. It is also seen that the apparatus may be of very simple construction for manual operation, but is nevertheless susceptible to varying degrees of automation as desired, by the provision of automatic controls for moving the combs and for performing others of the operations described.

FIGS. 13a–13d diagrammatically illustrate further possible variations in the apparatus while still utilizing the essential concepts of the present invention. For a better understanding of these diagrams reference may be made to FIG. 13 which illustrates diagrammatically the arrangement heretofore described, wherein elements 2 and 8 designate the two pairs of coarse combs, elements 4 and 6 designate the two pairs of fine combs, w designates the wires supported between combs 2 and 8 and critically positioned by combs 4 and 6, and 150 designates generally the molding plates 50–53. All these numerals (except 150) correspond to those used in the above-described embodiments of the apparatus.

In FIG. 13, it will be noted that the wires are critically positioned at two points or planes, namely the plane of combs 6 and the plane of combs 4, whereby there is a considerable span of the wires (that between the two pairs of combs 4, 6) which is maintained in the critical spatial relationship. In the event the wires need be critically spaced at only one point or plane, it would be necessary to use only one pair of fine combs. This is shown in FIG. 13a, wherein the portion of the wires engaged by fine combs 6' alone would be positioned in the critical relationship. In this figure, it would be preferable to make the fine teeth portions (66, 66') of combs 6' in the form of removable inserts, so that when the combs are moved to seat the wires in those portions, the removable inserts may be detached from the combs and remain a part of the molded assembly. This would facilitate the removal of the rest of the comb structure from the wire assembly before, or after, encapsulation. Particularly in this embodiment, the molding plates (not shown in FIG. 13a) need not be integral with the comb structure.

FIG. 13b illustrates a still further arrangement wherein a plurality of encapsulated assemblies, each similar to that of FIG. 13, are produced during each operation of the apparatus. In this arrangement, the coarse comb pairs 2' and 8' support the wires as heretofore described, whereas the fine combs 4' and 6' are constructed so as to form a plurality of wire w assemblies spaced from each other by spacings s, each assembly as in FIG. 13 and enclosed by mold plates 150'. As illustrated in this figure, the encapsulated assemblies would be spaced horizontally from each other.

FIG. 13c illustrates a similar arrangement for producing during one operation a plurality of encapsulated wire assemblies. In FIG. 13c, however, the wire assemblies are spaced vertically (space s) and for this purpose there are a plurality of fine comb assemblies 6', 6'' and 4', 4'', each constructed as above described but spaced vertically and operated simultaneously to produce the plurality of assemblies. 150' and 150'' designate the molding plates that would be applied about the critically-spaced wires of each assembly, it being noted that no molding plates would be applied in the space s between fine combs 4' and 6''. The span of the wires in space s would not be encapsulated but would be severed to provide the free ends for their respective encapsulated assemblies.

FIG. 13d illustrates a still further arrangement wherein a plurality of arrays of wires are formed and encapsulated at the same time, but here they are formed integrally with no spaces between encapsulated assemblies. For this purpose, fine combs 4', 6' are formed so as to position the wires w in a plurality of arrays all molded together by a single mold 150'.

The produced encapsulated electrode assembly 130 (FIG. 6), either before or after cut in two (FIG. 6a), may be built up in any suitable manner into a complete printing head including the external connectors for each of the electrodes in the assembly. A suitable method and jig fixture is described below with respect to FIGS. 14 and 15, this technique being particularly useful for volume production and where internal resistors are to be incorporated into the complete printing head.

The jig fixture, generally designated 160, used for building up the encapsulated electrode assembly 130 into complete printing heads including terminals for forming the external connections, and preferably also including the internal resistors, for each of the electrodes is illustrated in FIG. 14. The fixture illustrated is used for building two heads simultaneously, and therefore the unsevered assembly 130 (FIG. 6) is used. The fixture includes a cover member 162 removably secured across the center thereof for positioning the assembly 130. The fixture is formed with a pair of cavities formed by walls 164 of the fixture and assembly 130. In each cavity is positioned a preformed insulating element 170, which may be separate pieces or may be joined by an interconnecting web (not shown). Each preformed insulating element 170 carries the required number (one for each electrode) of resistors 172, the required number of terminals 174, lead connections 176 between each resistor and its terminal, and lead connections 178 from each resistor and terminating adjacent to the electrode assembly 130 for connection to the individual electrodes thereof. Preferably, all the foregoing are applied to insulating elements 170 by printed circuit techniques. Half the resistors 172 and their leads 176, 178 may be formed on one surface of element 170 and the other half on the opposite surface. This is the case in FIG. 14 wherein it is seen that each of the illustrated resistors 172 is connected to every other terminal 174, it being understood that the resistors formed on the opposite surface would be connected to the remaining terminals. The terminals could be similarly formed half on one surface of element 170 and half on the oposite surface, if desired.

In using the jig fixture of FIG. 14 for assembling complete printing heads, elements 170 are first inserted in the fixture, the encapsulated electrode assembly 130 is placed in position and cover plate 162 is secured, as illustrated. The free ends of the wires w projecting from the encapsulated assembly 130 are then connected to their respective conductive leads 176 to form electrical connections from each electrode w, lead 178, resistor 172, lead 176 to its terminal 174. Since one-half of the resistors are formed on each surface of element 170, one-half of the connections are made to one surface of element 170 and the other half are made to the opposite surface. To facilitate making these connections, the end of element 170 contiguous to electrode assembly 130 is recessed, at 170', so as not to interfere with the electrodes projecting from the assembly 130. The surface of the preformed element 170 may be formed with spaced grooves extending between surface 170' to leads 178. The individual wires from assembly 130 are then extended through the grooves so as to overlap at 180 their respective conductive leads 178, the grooves retaining the wires in this spaced relationship until the molding compound is subsequently applied. Therefore, it is not necessary that the wires be individually insulated. When the wires are thus all positioned in the grooves, with their projecting ends overlapping their respective leads 178, they may be secured thereto by a simultaneous welding or soldering operation at 180. The same connections are also made to the other element 170 by the wires projecting from the opposite end of assembly 130, it being understood that these connections are made to both surfaces of elements 170. At this point the two assemblies may be tested for electrical continuity, etc., by establishing testing circuits from each terminal 174 of one head, through its respective resistor 172, its electrode in assembly 130, the corresponding resistor of the other head, and its corresponding terminal. Another cover member 166 is then secured to the marginal edges of elements 170 occupied by the terminals 174 in order to hold these elements in position during molding and also to shield terminals 174 from the molding compound. Molding compound is then applied to join elements 170 with assembly 130 and to encapsulate the whole, but leaving the terminal 174 exposed for making the external connections. The molded assembly may then be cut in two through the middle of electrode assembly 130 to produce two complete printing heads, each (as illustrated in FIG. 15) including the matrix or array of critically-spaced wire electrodes individually connected to a resistor 172 and a terminal 174.

Many other variations can be made in the apparatus and methods disclosed. For example, the molding plates 50–53 could of course be separate from the comb structures. It will be also understood that the invention may be embodied in apparatus for positioning or assembling many other types of arrays, for example only one row or one column of wires instead of a rectangular matrix. Further, the apparatus is well adapted for making other articles (other than electrode assemblies) involving critically-spaced elongated elements such as wires, strands, threads, and the like. Many other modifications, variations and applications of the invention will be apparent to those skilled in the art coming within the spirit and scope of the invention as defined in the following claims.

I claim:

1. Apparatus of the character described for positioning a plurality of wires or the like in a required spatial relationship, comprising: means for positioning a plurality of wires to form a matrix of rows and columns of wires; and means mounted for engagement with the wires so positioned and comprising a pair of combs movable into a crossed juxtapositional relationship, each of said combs carrying spaced elements having first portions engageable with said wires, second portions spaced in accordance with said required critical spatial relationship, and an intermediate portion interconnecting said first and second portions.

2. Apparatus of the character described for positioning a plurality of wires or the like in a required spatial relationship, comprising: first comb means mounted for engagement with a plurality of wires at a first station, said comb means having uncritically-spaced elements for positioning the wires in uncritical spatial relationships; second comb means mounted for engagement with the plurality of wires at a second station, said second comb means comprising a pair of spaced combs each of substantially the same structure and carrying spacing elements having first straight portions spaced in accordance with the elements of said first comb means, second straight portions parallel to said first straight portions but spaced in accordance with said required critical spatial relationship, and an intermediate portion interconnecting said first and second portions; and third comb means of the same structure as said first comb means and mounted for engagement with the wires at a third station; each of said first and third comb means being movable from its normal station past the second station to the normal station of the other of said first and third comb means.

3. Apparatus of the character described for positioning a plurality of wires or the like in a required spatial relationship, comprising: first comb means mounted for engagement with a plurality of wires at a first station, said comb means having uncritically-spaced teeth for positioning the wires in uncritical spatial relationships and movable together to grip the wires therebetween; second comb means mounted for engagement with the plurality of wires at a second station, said second comb means carrying spacing elements having first portions engageable with said uncritically-spaced wires, second portions spaced in accordance with said required critical spatial relationship, and an intermediate portion interconnecting said first and second portions; and third comb means of substantially the same structure as said first comb means and mounted for engagement with the wires at a third station; each of said first and third comb means being movable from its normal station past the second station to the normal station of the other of said first and third comb means.

4. Apparatus of the character described for positioning a plurality of wires or the like in a required critical spatial relationship, comprising: means for positioning a plurality of wires to form a matrix of rows and columns of wires at a station, said means comprising first means for engaging said wires at a point on one side of said station and second means for engaging said wires at a point on the other side of said station; comb means at said station; and means mounting said comb means for movement toward and away from the matrix of wires; said comb means comprising a pair of combs mounted for movement at right angles to each other into an overlapping juxtapositional relationship, each of said combs having a first portion engageable with said wires, a second portion spaced in accordance with required critical spatial relationship, and an intermediate portion interconnecting said first and second portions.

5. Apparatus for positioning wires and the like in critical spatial relationships, comprising: first positioning means at a first station and comprising a plurality of first elements engageable with the wires to position said wires in uncritical spatial relationships; second positioning means at a second station and comprising a plurality of second elements engageable with the wires, said second elements having first portions engageable with said uncritically-spaced wires, second portions spaced in accordance with the critical spatial relationships of the wires, and an intermediate portion interconnecting said first and second portions; means mounting said first positioning means for movement from said first station past said second station; means carried by said first positioning means for moving said wires therewith past said second station while maintaining said wires in uncritical spatial relationships at said second station; and means mounting said second positioning means for movement to engage the uncritically-spaced portions of the wires at the second station by said first portion, then by said intermediate portion, and then by said second portion of said second elements.

6. Apparatus as defined in claim 5 further including means for guiding said wires during said movement by said first positioning means, said guiding means including means for applying a uniform tension to said wires.

7. Apparatus of the character described for positioning a plurality of wires or the like in a required spatial relationship, comprising: first comb means including a pair of combs mounted for movement into a crossed juxtapositional relationship for engagement with a plurality of wires at a first station, each of said combs having a plurality of teeth movable together for gripping the wires therebetween; second comb means mounted for engagement with the plurality of wires at a second station, said second comb means carrying spacing elements engageable with said wires and spacing same in accordance with said required critical spatial relationship; and third comb means including the same structure as above-defined for the first comb means and mounted for engagement with the wires at a third station; each of said first and third comb means being movable from its normal station past the second station to the normal station of the other of said first and third comb means.

8. Apparatus of the character described for positioning a plurality of wires or the like in a required spatial relationship, comprising: first comb means including a pair of combs mounted for movement into a crossed juxtapositional relationship for engagement with a plurality of wires at a first station, each of said combs having uncritically-spaced teeth for positioning the wires in uncritical spatial relationships and movable together to grip the wires therebetween; second comb means mounted for engagement with the plurality of wires at a second station, said second comb means carrying spacing elements having first portions engageable with said uncritically-spaced wires, second portions spaced in accordance with said required critical spatial relationship, and an intermediate portion interconnecting said first and second portions; and third comb means of substantially the same structure as said first comb means and mounted for engagement with the wires at a third station; each of said first and third comb means being movable from its normal station past the second station to the normal station of the other of said first and third comb means.

9. Apparatus of the character described for positioning and assembling a plurality of wires or the like in a required critical spatial relationship, comprising: first means engageable with the wires at spaced points thereof to position the span therebetween in an uncritical spatial relationship; spacing elements having first portions engageable with the uncritically-spaced wires, second portions spaced in accordance with said required critical spatial relationship, and intermediate portions interconnecting said first and second portions; and means permitting relative movement between said wires and said spacing elements to permit said wires to move from said first portions of said spacing elements through said intermediate portions to said second portions; said first means including means for gripping the wires for moving same to provide a new span of uncritically-spaced wires in position for engagement by said spacing elements.

10. Apparatus of the character described for positioning and assembling a plurality of wires or the like in a required critical spatial relationship, comprising: means engageable with the wires at spaced points thereof to position the span therebetween in an uncritical spatial relationship; spacing elements having first portions engageable with the uncritically-spaced wires, second portions spaced in accordance with said required critical spatial relationship, and intermediate portions interconnecting said first and second portions; means permitting relative movement between said wires and said spacing elements to permit said wires to move from said first portions of said spacing elements through said intermediate portions to said second portions; and means for fixing said wires in their required spatial relationship assumed at said second portions of said spacing elements.

11. Apparatus of the character described for positioning and assembling a plurality of wires or the like in a required critical spatial relationship, comprising: means engageable with the wires at spaced points thereof to position the span therebetween in an uncritical spatial relationship; spacing elements having first portions engageable with the uncritically-spaced wires, second portions spaced in accordance with said required critical spatial relationship, and intermediate portions interconnecting said first and second portions; means permitting relative movement between said wires and said spacing elements to permit said wires to move from said first portions of said spacing elements through said intermediate portions to said second portions; and plates carried by said spacing elements forming a mold for receiving molding material to fix said wires in their required spatial relationship assumed at said second portions of said spacing elements.

12. A method for positioning and assembling a plurality of wires or the like in a required critical spatial relationship, comprising: engaging the wires at spaced points thereof to position the span therebetween in an uncritical spatial relationship; engaging said span by spacing elements having first portions engageable with the uncritically-spaced wires and second portions spaced in accordance with said required critical spatial relationship; effecting relative movement between said wires and said spacing elements to cause said wires to move from said first portions of said spacing elements to said second portions; fixing said wires in their required spatial relationship assumed at said second portions of said spacing elements; gripping said wires at one of said spaced points; severing said fixed portion of said wires; withdrawing said spacing elements; and moving said wires by said gripping means to provide a new span of uncritically-spaced wires in position to be engaged by said spacing elements.

13. A method for positioning and assembling a plurality of wires or the like in a required critical spatial relationship, comprising: engaging the wires at spaced points thereof to position the span therebetween in an uncritical spatial relationship; engaging said span by spacing elements having first portions engageable with the uncritically-spaced wires and second portions spaced in accordance with said required critical spatial relationship; effecting relative movement between said wires and said spacing elements to cause said wires to move from said first portions of said spacing elements to said second portions; and applying molding material to said wires in their required spatial relationship assumed at said second portions of said spacing elements.

14. A method for positioning and assembling a plurality of wires or the like in a required critical spatial relationship, comprising: engaging the wires at spaced points thereof to position the span therebetween in an uncritical spatial relationship; engaging said span by spacing elements having first portions engageable with the uncritically-spaced wires, second portions spaced in accordance with said required critical spatial relationship, and intermediate portions interconnecting said first and second portions; effecting relative movement between said wires and said spacing elements to cause said wires to move from said first portions of said spacing elements through said intermediate portions to said second portions; applying molding material to said wires in their required spatial relationship assumed at said second portions of said spacing elements; gripping said wires at one of said spaced points; severing said molded portion of said wires; withdrawing said spacing elements; and moving said wires by said gripping means to provide a new span of uncritically-spaced wires in position to be engaged by said spacing elements.

References Cited in the file of this patent

UNITED STATES PATENTS

| | | |
|---|---|---|
| 1,010,788 | Nordfors | Dec. 5, 1911 |
| 1,289,015 | Suter | Dec. 24, 1918 |
| 2,306,760 | Shaw | Dec. 29, 1942 |
| 2,386,689 | Kaufmann | Oct. 9, 1945 |
| 2,402,338 | Morehead | June 18, 1946 |
| 2,870,728 | Goodykoontz | Jan. 27, 1959 |
| 2,931,065 | Joyce | Apr. 5, 1960 |
| 2,974,368 | Joyce | Mar. 14, 1961 |